United States Patent
Kim et al.

(10) Patent No.: US 7,773,637 B2
(45) Date of Patent: Aug. 10, 2010

(54) SIGNAL TRANSMITTING METHOD AND APPARATUS USING LENGTH DIVISION MULTIPLE ACCESS

(75) Inventors: Jae-hyon Kim, Suwon-si (KR);
Young-hwan Kim, Hwaseong-gun (KR);
Su Khiong Yong, Yongin-si (KR);
Seong-soo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1137 days.

(21) Appl. No.: 11/360,524

(22) Filed: Feb. 24, 2006

(65) Prior Publication Data

US 2006/0215706 A1    Sep. 28, 2006

(30) Foreign Application Priority Data

Mar. 24, 2005    (KR) .................... 10-2005-0024441

(51) Int. Cl.
*H04J 3/06* (2006.01)

(52) U.S. Cl. .................. 370/517; 370/516; 370/503; 370/498; 370/464; 341/143; 341/126

(58) Field of Classification Search .......... 370/434, 370/465, 498, 503, 516, 517, 535–537, 511–512, 370/520; 341/143, 126
See application file for complete search history.

(56) References Cited

U.S. PATENT DOCUMENTS 5,506,795 A    4/1996    Yamakawa
(Continued)

FOREIGN PATENT DOCUMENTS

JP    6-231287    8/1999
JP    2002-290274 A    10/2002

OTHER PUBLICATIONS

Tam, W.M. et al., "A Multiple Access Scheme for Chaos-Based Digital Communication Systems Utilizing Transmitted Reference", Circuits and Systems I: Regular Papers, IEEE Transactions on [see also Circuits and Systems I: Fundamental Theory and Applications, IEEE Transactions on] vol. 51, Issue 9, Sep. 2004, pp. 1868-1878.

(Continued)

*Primary Examiner*—William Trost, IV
*Assistant Examiner*—Kyle C Kasparek
(74) *Attorney, Agent, or Firm*—Sughrue Mion, PLLC

(57) ABSTRACT

A method and apparatus for simplifying a structure needed to delay data in delay units when a reference signal and data are transmitted by using chaotic signals are provided. The method includes delaying data by at least two delay times, wherein each of the delay times occurs sequentially; multiplexing the data, which has been delayed, according to a control signal; and transmitting the data and a reference signal which corresponds to the data at an interval of delay time. The apparatus includes a first delay unit which is configured to delay data for a first delay time; a second delay unit which is configured to delay the data output from the first delay unit for a second delay time; and a multiplexer which is configured to multiplex the data from the first and second delay units according to a control signal.

18 Claims, 6 Drawing Sheets

U.S. PATENT DOCUMENTS

| | | | | |
|---|---|---|---|---|
| 5,724,037 | A * | 3/1998 | Lee | 341/143 |
| 6,028,544 | A * | 2/2000 | Zarubinsky et al. | 341/143 |
| 6,157,939 | A * | 12/2000 | Vo et al. | 708/628 |
| 6,754,841 | B2 * | 6/2004 | Yang | 713/503 |
| 7,054,331 | B1 * | 5/2006 | Susnow et al. | 370/465 |
| 2003/0128657 | A1 * | 7/2003 | Kuroyanagi et al. | 370/205 |
| 2003/0174799 | A1 * | 9/2003 | Fahim | 375/376 |
| 2004/0247121 | A1 * | 12/2004 | Lee et al. | 380/205 |
| 2005/0140438 | A1 * | 6/2005 | Jin et al. | 330/149 |

OTHER PUBLICATIONS

Wai Tam et al. "Generalized Correlation-Delay-Shift-Keying Scheme for Noncoherent Chaos-Based Communications Systems" IEEE 2004, pp. IV-601 to IV-604.

* cited by examiner

SIGNAL TRANSMITTING METHOD AND APPARATUS USING LENGTH DIVISION MULTIPLE ACCESS

CROSS-REFERENCE TO RELATED APPLICATION

This application claims the benefit of Korean Patent Application No. 2005-24441 filed on Mar. 24, 2005, in the Korean Intellectual Property Office, the disclosure of which is incorporated herein by reference.

BACKGROUND OF THE INVENTION

1. Field of the Invention

The present invention relates to a method and apparatus for transmitting signals by using chaotic signals having an orthogonal property in a wireless or wired communication system.

2. Description of the Prior Art

Multiple access is a method for accessing a particular resource when a plurality of devices request resources whose quantity is limited. Herein, the resources signify all elements needed for communication. Take, for example, a base station in a wireless sector. A plurality of terminals attempt to access one base station, and collision occurs when the multiple terminals request access to a limited frequency and equipment of the base station. One of the methods for preventing the collision is random access but other diverse methods are also available.

The multiple access includes Code Division Multiple Access (CDMA), Frequency Division Multiple Access (FDMA), and Time Division Multiple Access (TDMA).

The FDMA is a technique for communication in which an allocated frequency band is divided into sub-bands and a corresponding sub-band is assigned to a terminal attempting to communicate. A representative technique of the FDMA is an Advanced Mobile Phone Service (AMPS), which is the initial analogue mobile telephony.

The TDMA is a technique in which a frequency is temporally divided and used. In TDMA, a frequency is divided into a sequence of time slots and each time slot is allocated to a subscriber. A well-known example of the TDMA is the Global System for Mobile Communication (GSM) and the Narrow-AMPS (N-AMPS), which are used in Europe.

The CDMA divides a frequency into channels by using codes in a wireless sector. Of course, each channel uses the same frequency band and the same frequency width. Since each channel is operated by electric wave energy in the wireless sector according to the intensity of electric wave, a channel using strong electric waves has much energy. In other words, to discriminate between subscribers, the CDMA uses different pseudo noise (PN) codes of the same length.

FIG. 1 shows a conventional transmitter for multiple access using chaotic signals. The transmitter attempting multiple access by using chaotic signals includes a chaotic signal generator 100, a delay unit 102, a multiplier 104, and a multiplexer 106.

The chaotic signal generator 100 generates chaotic signals. The characteristics of chaotic signals will be described later. The chaotic signals generated in the chaotic signal generator 100 are output to the multiplexer 106 and the delay unit 102.

The delay unit 102 delays the transmitted signals for a certain time, which may be predetermined, and then outputs the delayed signals to the multiplexer 106 and the multiplier 104. The multiplier 104 multiplies the signals by −1 and outputs the result to the multiplexer 106. The multiplexer 106 receives the signals from one of the delay unit 102 and the multiplier 104 at a specific time point. The multiplexer 106 outputs one of the received signals upon receipt of a control signal. Hereafter, the signals output from the transmitter for multiple access using the chaotic signals will be described.

FIG. 2 presents signals transmitted from four subscribers. The four subscribers are a subscriber 1, a subscriber 2, a subscriber 3, and a subscriber 4. The reference 'R' of FIG. 2 denotes a reference signal and the reference 'D' denotes data. The transmission length of the reference signal is the same as that of the data. Therefore, although FIG. 2 illustrates only one delay unit, when the four subscribers are to transmit signals, the number of delay units becomes four.

Also, the reference 'R1, 1' denotes a signal that the transmission subscriber 1 transmits to a reception subscriber 1, and the reference 'R2, 1' denotes a signal that a transmission subscriber 2 transmits to the reception subscriber 1. In FIG. 2, the transmission subscriber 1 transmits data after delaying the data for a first delay time, compared to the reference signal, and the transmission subscriber 2 transmits data after delaying the data for two times the first delay time, compared to the reference signal. Also, the transmission subscriber 3 transmits data after delaying the data for three times the first delay time, compared to the reference signal, and the transmission subscriber 4 transmits data after delaying the data for four times the first delay time, compared to the reference signal.

In short, the delay unit differentiates the delay time for each transmission subscriber. The delay unit of the transmission subscriber 1 outputs the data after delaying them for the first delay time, while the delay unit of the transmission subscriber 2 outputs the data after delaying them for two times the first delay time. Also, the delay unit of the transmission subscriber 3 outputs the data after delaying them for three times the first delay time, while the delay unit of the transmission subscriber 4 outputs the data after delaying them for four times the first delay time.

FIG. 3 shows a structure of the receiver. The receiver includes a delay unit 300, a multiplier 302 and an accumulator 304. The delay unit 300 delays data among the transmitted signals for a certain time and transmits the data to the multiplier 302. This certain time may also be predetermined. The multiplier 302 multiplies the data received from the delay unit 300 by the reference signal received from the transmitter and outputs the multiplied signals to the accumulator 304. The accumulator 304 accumulates the transmitted signals. Hereafter, the operation of the delay unit 300 will be described with reference to FIG. 2.

The delay unit 300 in the receiver transmits signals corresponding to data among the transmitted signals directly to the multiplier 302 to recover the signals transmitted from the transmission subscriber 1 and transmits the reference signal to the multiplier 302 after delaying it for the first delay time. This way, the multiplier 302 can acquire desired signals by receiving the data and the reference signal at the same time point.

The delay unit 300 of the receiver transmits signals corresponding to data among the transmitted signals directly to the multiplier 302 to recover the signals transmitted from the transmission subscriber 2 and transmits the reference signal to the multiplier 302 after delaying it for 2× the first delay time.

The delay unit 300 of the receiver transmits signals corresponding to data among the transmitted signals directly to the multiplier 302 to recover the signals transmitted from the transmission subscriber 3 and transmits the reference signal to the multiplier 302 after delaying it for 3× the first delay time.

The delay unit 300 of the receiver transmits signals corresponding to data among the transmitted signals directly to the multiplier 302 to recover the signals transmitted from the transmission subscriber 4 and transmits the reference signal to the multiplier 302 after delaying it for 4× the first delay time.

As described above, the receiver uses delay times established differently according to each transmission subscriber to acquire the signals transmitted from a particular transmission subscriber. The more transmission subscribers there are, the longer the delay time becomes. Therefore, there is a problem that the structure of the delay unit is complicated as the number of transmission subscribers is increased.

SUMMARY OF THE INVENTION

It is, therefore, an aspect of the present invention to provide a method for simplifying a structure required to delay data in delay units.

It is another aspect of the present invention to provide a method for reducing cost by simplifying the structure needed to delay data in delay units.

In accordance with an aspect of the present invention, there is provided a data transmitting apparatus including a first delay unit which is configured to delay data to be transmitted for a first delay time; a second delay unit which is configured to delay the data output from the first delay unit for a second delay time; and a multiplexer which is configured to multiplex the data output from the first and second delay units according to a control signal.

In accordance with another aspect of the present invention, there is provided a reference signal receiving apparatus including a first delay unit which is configured to delay a received reference signal for a first delay time; a second delay unit which is configured to delay the reference signal output from the first delay unit for a second delay time; and a multiplexer which is configured to multiplex the reference signals output from the first and second delay units according to a control signal.

In accordance with another aspect of the present invention, there is provided a data transmitting method including delaying data to be transmitted by at least two delay times, wherein each of the at least two delay times occurs sequentially; multiplexing the data, which has been delayed, according to a control signal; and transmitting the data and a reference signal which corresponds to the data at an interval of delay time.

In accordance with yet another aspect of the present invention, there is provided a data receiving method including delaying reference signals by at least two delay times, wherein each of the at least two delay times occurs sequentially; multiplexing the reference signals, which have been delayed, according to a control signal; and multiplying data by the reference signal, which has been multiplexed.

BRIEF DESCRIPTION OF THE DRAWINGS

The above and other aspects of the present invention will be more apparent by describing certain exemplary embodiments of the present invention with reference to the accompanying drawings, in which.

DETAILED DESCRIPTION OF EXEMPLARY EMBODIMENTS OF THE PRESENT INVENTION

Figure 1:
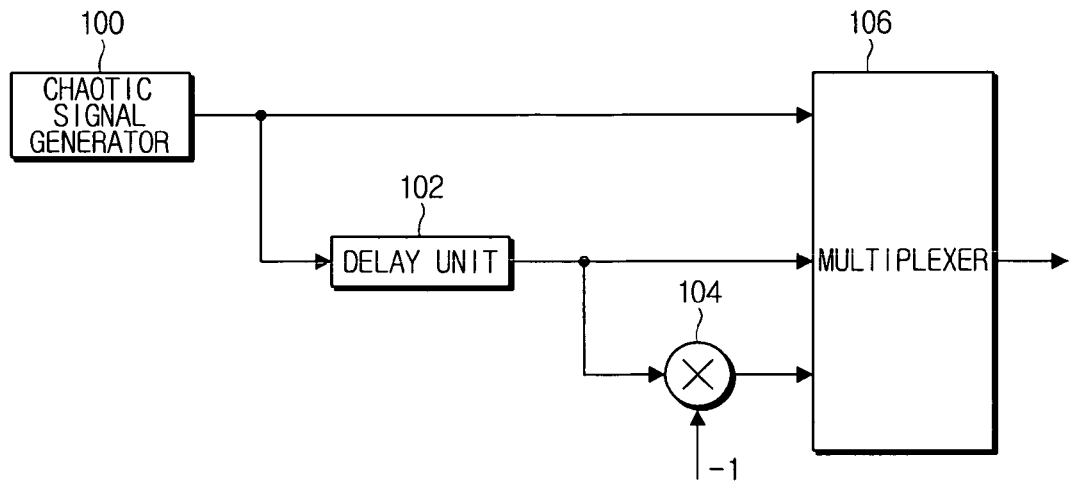
FIG. 1 is a block diagram showing a conventional transmitter for transmitting data by using chaotic signals.

Certain exemplary embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

The present invention suggests a method for transmitting data by using at least two delay units having different delay times. In other words, signals of a different length are transmitted for each transmission subscriber. First, chaotic signals used in the present invention will be described hereafter.

Figure 4:
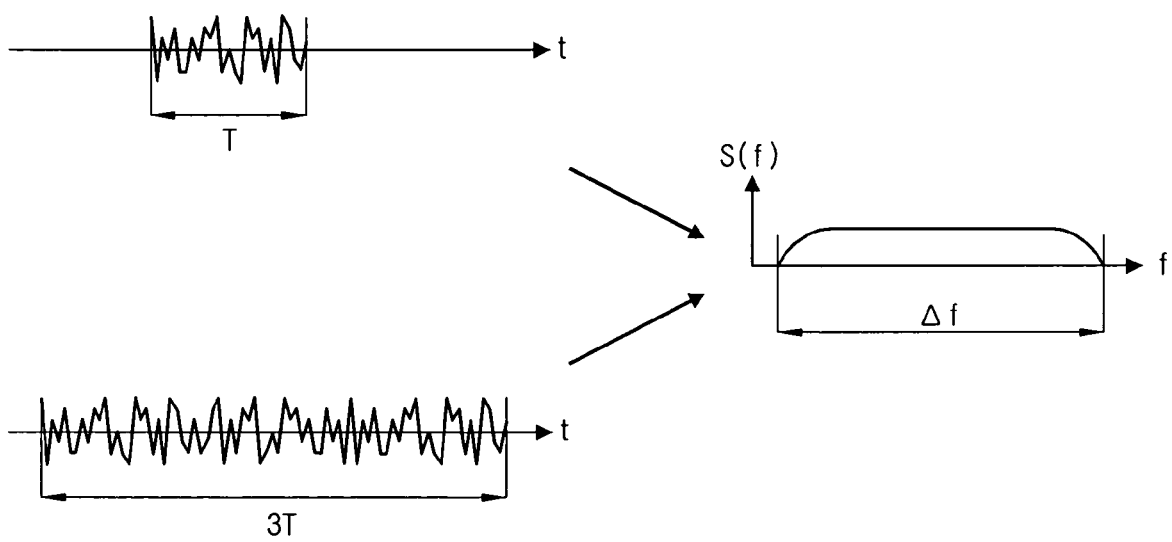
FIG. 4 is a diagram illustrating characteristics of a chaotic signal.

FIG. 4 shows a signal having a period T and a signal having a period 3T. Although chaotic signals have different data transmission rates, i.e., have different pulse periods, they have the same amplitude in spectra.

As illustrated in FIG. 4, the chaotic signal having the period T and the chaotic signal having the period 3T have the same amplitude of $\Delta f$ in spectra.

Figure 5:
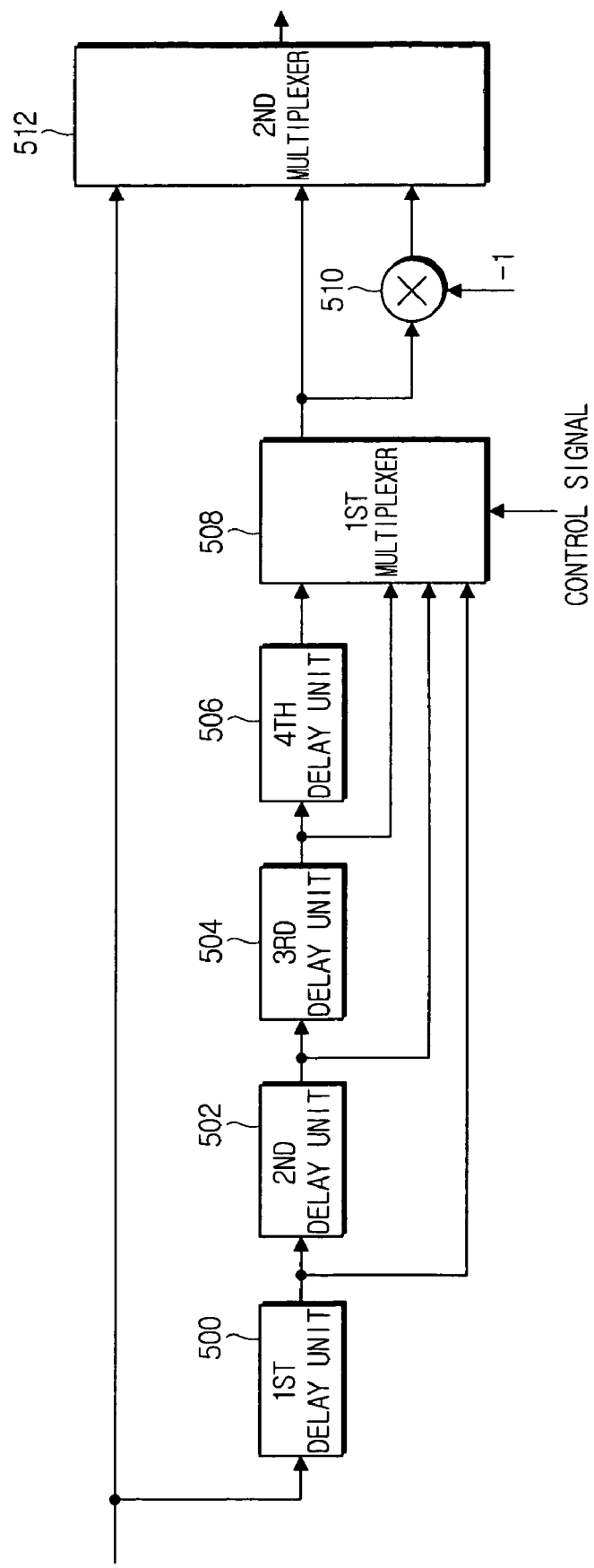
FIG. 5 is a block diagram describing a transmitter for transmitting data by using chaotic signals in accordance with an exemplary embodiment of the present invention.

FIG. 5 shows a structure of a transmitter realizing multiple access in accordance with an exemplary embodiment of the present invention. In particular, it is assumed in FIG. 5 that four subscribers transmit signals for the sake of convenience in description. The transmitter includes first to fourth delay units 500, 502, 504 and 506, respectively, a first multiplexer 508, a multiplier 510, and a second multiplexer 512.

In FIG. 5, the first to fourth delay units 500 to 506 have different delay times. The delay time of the first delay unit 500 is different from those of the second to fourth delay units 502 to 506. Moreover, the delay time of the first delay unit 500 is longer than those of the second to fourth delay units 502 to 506. Of course, the delay times of the second to fourth delay units 502 to 506 can also be different from each other. However, in the following description, the second to fourth delay units 502 to 506 are described as having the same delay time for the sake of convenience in description.

Among chaotic signals generated in a chaotic signal generator (not shown), a chaotic signal mapped to a reference signal is delivered to the first multiplexer 508 and those mapped to data are delivered to the first delay unit 500. The first delay unit 500 outputs received chaotic signals after delaying them for an $a^{th}$ delay time. When a transmission subscriber 1 transmits signals, the first delay unit 500 delivers delayed signals to the first multiplexer 508. When transmission subscribers 2 to 4 transmit signals, the first delay unit 500 delivers delayed signals to the second delay unit 502.

The second delay unit 502 outputs the transmitted signals after delaying them for a $b^{th}$ delay time, wherein a>>b. When a transmission subscriber 2 transmits signals, the second delay unit 502 delivers delayed signals to the first multiplexer 508. When transmission subscribers 3 and 4 transmit signals, the second delay unit 502 delivers delayed signals to the third delay unit 504.

The third delay unit 504 outputs the transmitted signals after delaying them for the $b^{th}$ delay time, wherein a>>b. When the transmission subscriber 3 transmits signals, the third delay unit 504 delivers delayed signals to the first multiplexer 508. When the transmission subscriber 4 transmits signals, the third delay unit 504 delivers delayed signals to the fourth delay unit 506.

The fourth delay unit 506 outputs the transmitted signals after delaying them for the $b^{th}$ delay time, wherein a>>b. When the transmission subscriber 4 transmits signals, the fourth delay unit 506 delivers delayed signals to the first multiplexer 508.

The first multiplexer 508 selects one out of the transmitted signals upon receipt of a control signal and outputs the selected signal. Hereafter, signals output from a structure performing multiple access by using chaotic signals will be described.

Figure 2:
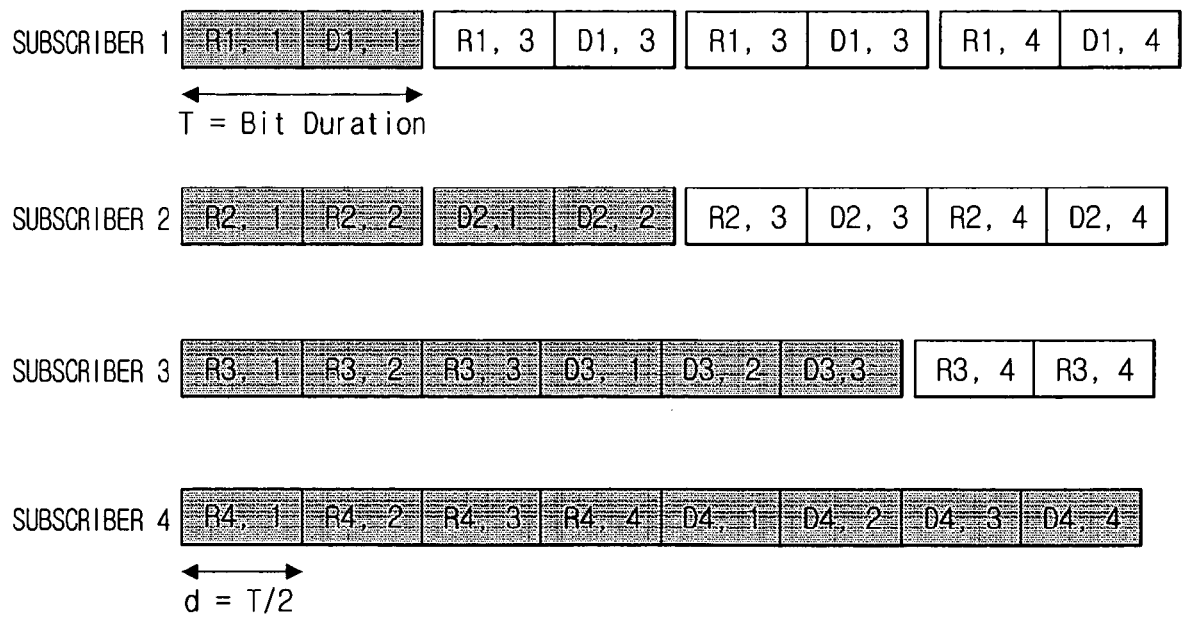
FIG. 2 is a diagram illustrating data patterns transmitted from a plurality of subscribers.
Figure 3:
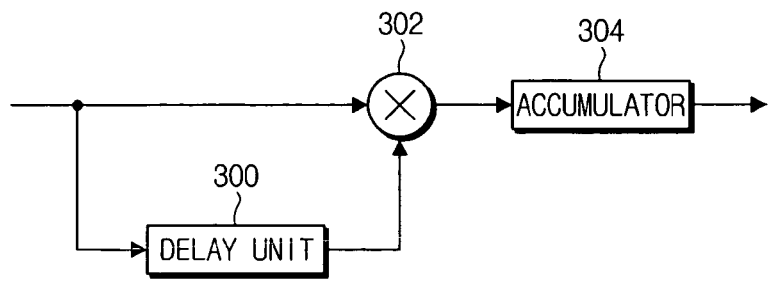
FIG. 3 is a block diagram describing a conventional receiver for receiving data transmitted by using chaotic signals.
Figure 6:
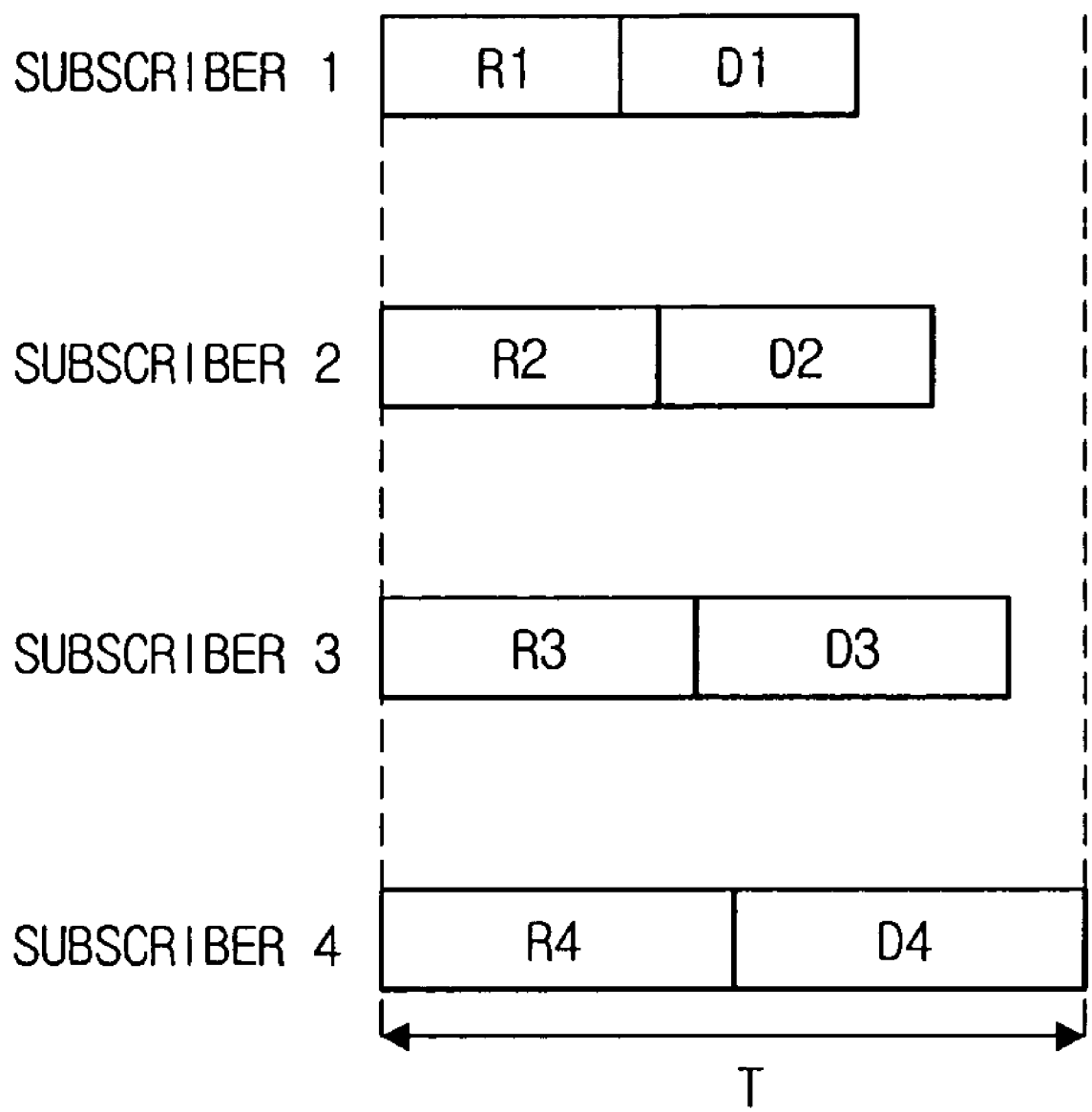
FIG. 6 is a diagram showing data patterns transmitted by a plurality of subscribers in accordance with an exemplary embodiment of the present invention.

FIG. 6 illustrates signals transmitted from four subscribers. The four subscribers include subscribers 1 to 4. The reference 'R' shown in FIG. 2 denotes a reference signal, while the reference 'D' denotes data. The reference signal and the data have the same transmission length.

Also, the reference 'R1' indicates a reference signal transmitted from the transmission subscriber 1, and the reference 'R2' indicates a reference signal transmitted from the transmission subscriber 2. The reference 'R3' indicates a reference signal transmitted from the transmission subscriber 3, and the reference 'R4' indicates a reference signal transmitted from the transmission subscriber 4. The reference 'D1' indicates data transmitted from the transmission subscriber 1, and the reference 'D2' indicates data transmitted from the transmission subscriber 2. The reference 'D3' indicates data transmitted from the transmission subscriber 3, and the reference 'D4' indicates data transmitted from the transmission subscriber 4.

Referring to FIG. 6, the transmission subscriber 1 transmits data after delaying the data for the $a^{th}$ delay time, compared to the reference signal, and the transmission subscriber 2 transmits data after delaying the data for 'the $a^{th}$ delay time+the $b^{th}$ delay time,' compared to the reference signal. Also, the transmission subscriber 3 transmits data after delaying the data for 'the $a^{th}$ delay time+2× the $b^{th}$ delay time,' compared to the reference signal, and the transmission subscriber 4 transmits data after delaying the data for 'the $a^{th}$ delay time+3× the $b^{th}$ delay time,' compared to the reference signal.

Figure 7:
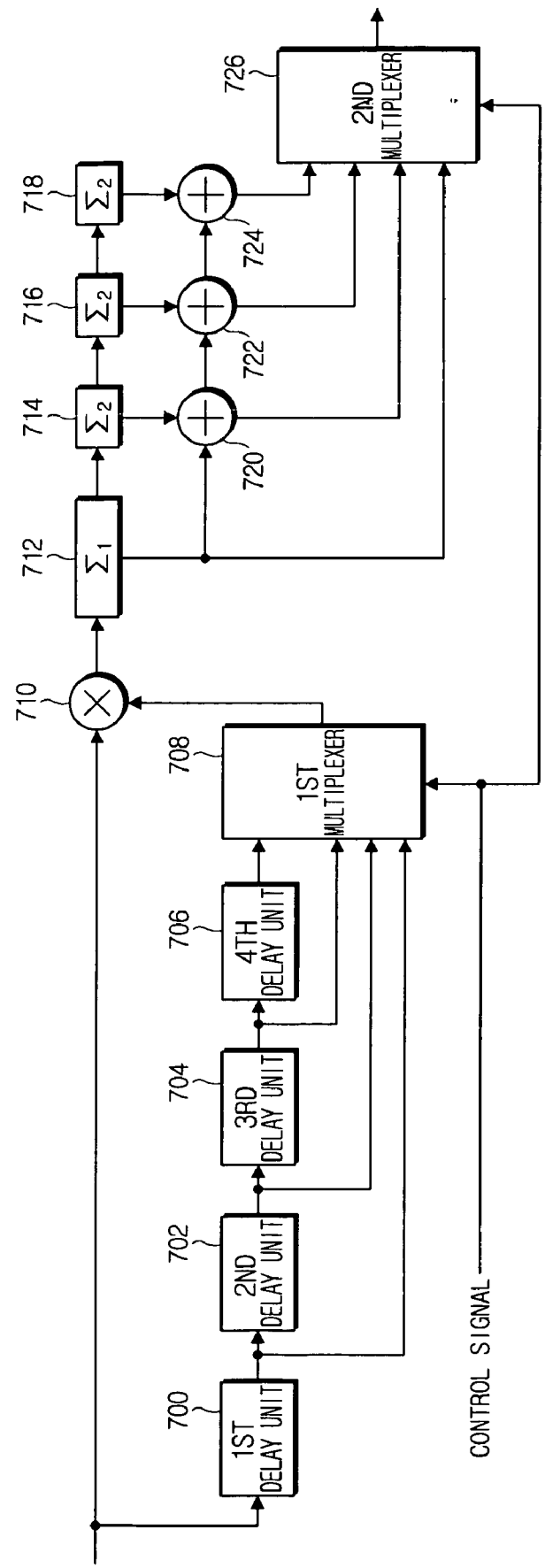
FIG. 7 is a block diagram describing a receiver for receiving data transmitted by using chaotic signals in accordance with an embodiment of the present invention.

FIG. 7 shows a structure of a receiver in accordance with an exemplary embodiment of the present invention. The receiver includes first to fourth delay units 700, 702, 704 and 706, a first multiplexer 708, a multiplier 710, first to fourth accumulators 712, 714, 716 and 718, first to third adders 720, 722 and 724, and a second multiplexer 726.

Among the transmitted signals, data are delivered to the multiplier 710, and a reference signal is delivered to the first delay unit 700. The first delay unit 700 delays the transmitted reference signal for an $a^{th}$ delay time. When the receiver attempts to acquire signals transmitted from the transmission subscriber 1, it transmits delayed signals to the first multiplexer 708. When the receiver attempts to acquire signals transmitted from the transmission subscribers 2 to 4, it transmits delayed signals to the second delay unit 702.

The second delay unit 702 delays the transmitted reference signal for a $b^{th}$ delay time. When the receiver attempts to receive signals transmitted from the transmission subscriber 2, it transmits delayed signals to the first multiplexer 708. When the receiver attempts to receive signals transmitted from the transmission subscribers 3 and 4, it transmits delayed signals to the third delay unit 704.

The third delay unit 704 delays the transmitted reference signal for the $b^{th}$ delay time. When the receiver attempts to acquire signals transmitted from the transmission subscriber 3, it transmits delayed signals to the first multiplexer 708. When the receiver attempts to acquire signals transmitted from the transmission subscriber 4, it transmits delayed signals to the fourth delay unit 706.

The fourth delay unit 706 delays the transmitted reference signal for the $b^{th}$ delay time. The delayed reference signal is transmitted to the first multiplexer 708.

The first multiplexer 708 outputs one of the transmitted signals upon receipt of a control signal. The signal output from the first multiplexer 708 is transmitted to the multiplier 710. The multiplier 710 multiplies the transmitted data by the reference signal and outputs a resultant signal to the first accumulator 712. The first accumulator 712 accumulates the transmitted signal and transmits the accumulated result to the second accumulator 714, the first adder 720 and the second multiplexer 726.

The second accumulator 714 accumulates the transmitted signal and transmits the accumulated result to the third accumulator 716 and the first adder 720. The third accumulator 716 accumulates the transmitted signal and transmits the accumulated result to the fourth accumulator 718 and the second adder 722. The fourth accumulator 718 accumulates the transmitted signal and transmits the accumulated result to the third adder 724.

The first adder 720 adds up the transmitted signals and transmits the result to the second adder 722 and the second multiplexer 726. The second adder 722 adds up the transmitted signals and transmits the result to the third adder 724 and the second multiplexer 726. The third adder 724 adds up the transmitted signals and transmits the result to the second multiplexer 726. The second multiplexer 726 outputs one out of the transmitted signals upon receipt of a control signal.

Figure 8:
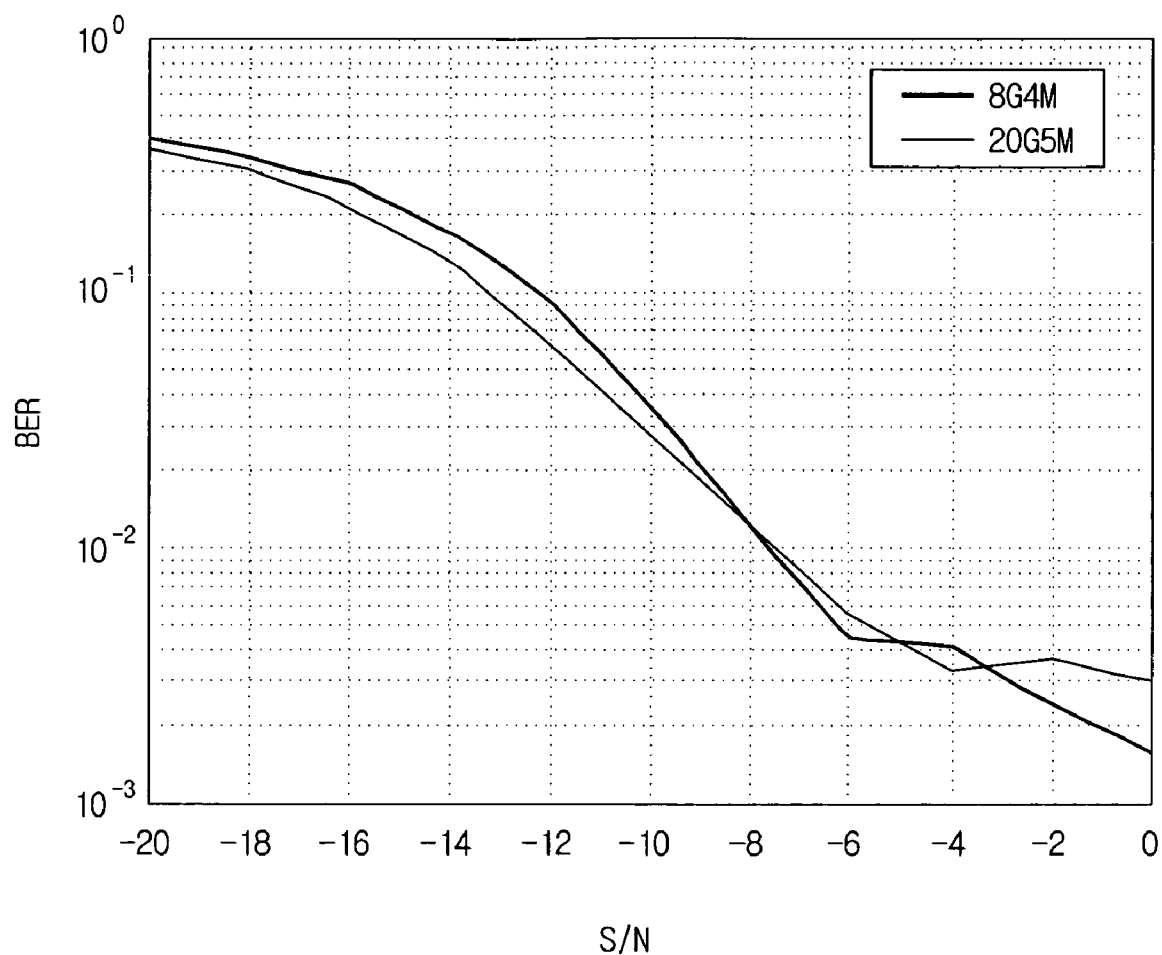
FIG. 8 is a graph showing the effect when delay units are used in accordance with an exemplary embodiment of the present invention.

FIG. 8 shows the effect of the delay units suggested in the present invention. Particularly, it is assumed in FIG. 8 that there are four transmission subscribers, that is, four delay units 700 to 706 are included. Also, the delay time of the second to fourth delay units 702 to 706 is a twentieth of the delay time of the first delay unit 700.

FIG. 8 also shows a case of 8 GHz sampling and 4 MHz bit rate (8G4M) and a case of 20 GHz sampling and 5 MHz bit rate (20G5M).

As described above, the present invention takes advantage of chaotic signals that although the signals have different periods, the chaotic signals have the same amplitude, and generates data transmission frames to have different length according to each subscriber. Of course, the difference between the sizes of the transmission frames generated for each subscriber are made small to accommodate as many subscribers as possible. This way, the structure of a transmitter and a receiver that perform multiple access can be simplified. In short, the structures of a transmitter and a receiver can be simplified by employing a plurality of delay units having different delay time instead of using delay units having the same delay time.

The foregoing embodiments and advantages are merely exemplary and are not to be construed as limiting the present invention. The present teaching can be readily applied to other types of apparatuses. Also, the description of exemplary embodiments of the present invention is intended to be illustrative, and not to limit the scope of the claims, and many alternatives, modifications, and variations will be apparent to those skilled in the art.

What is claimed is:

1. A data transmitting apparatus, comprising:
a first delay unit which is configured to delay data to be transmitted for a first delay time;
a second delay unit which is configured to delay the data output from the first delay unit for a second delay time; and
a first multiplexer which is configured to multiplex the data output from the first and second delay units according to a control signal,
wherein the first delay time is different from the second delay time, and
wherein a reference signal corresponding to the data and having a same transmission length as the data, is transmitted without delay, together with the multiplexed data.

2. The apparatus as recited in claim 1, wherein the first delay time is longer than the second delay time.

3. The apparatus as recited in claim 2, further comprising additional second delay units, wherein a number of the second delay units corresponds to a number of nodes transmitting the data,
wherein outputs of the additional second delay units are each input to the first multiplexer and multiplexed according to the control signal.

4. The apparatus as recited in claim 2, wherein the data is transmitted by mapping chaotic signals.

5. The apparatus as recited in claim 1 further comprising a multiplier which is configured to multiply an output from the first multiplexer by minus one.

6. A data transmitting apparatus, comprising:
a first delay unit which is configured to delay data to be transmitted for a first delay time;
a second delay unit which is configured to delay the data output from the first delay unit for a second delay time;
a first multiplexer which is configured to multiplex the data output from the first and second delay units according to a control signal;
a multiplier which is configured to multiply an output from the first multiplexer by minus one; and
a second multiplexer which is configured to multiplex the output from the first multiplexer, an output from the multiplier, and the data to be transmitted.

7. A reference signal receiving apparatus, comprising:
a first delay unit which is configured to delay a received reference signal for a first delay time;
a second delay unit which is configured to delay the reference signal output from the first delay unit for a second delay time;
a first multiplexer which is configured to multiplex the reference signals output from the first and second delay units according to a control signal; and
a multiplier which is configured to multiply data corresponding to the reference signal and having a same transmission length as the reference signal, by the reference signal output from the first multiplexer,
wherein the first delay time is different from the second delay time.

8. The apparatus as recited in claim 7, wherein the first delay time is longer than the second delay time.

9. The apparatus as recited in claim 8 further comprising additional second delay units, wherein a number of the second delay units corresponds to a number of nodes transmitting the reference signals,
wherein outputs of the additional second delay units are each input to the first multiplexer and multiplexed according to the control signal.

10. The apparatus as recited in claim 7 further comprising a first accumulator which is configured to accumulate an output of the multiplier.

11. The apparatus as recited in claim 10 further comprising a second accumulator which is configured to accumulate an output of the first accumulator.

12. The apparatus as recited in claim 11 further comprising a first adder which is configured to add an output of the first accumulator and an output of the second accumulator.

13. The apparatus as recited in claim 12 further comprising a second multiplexer which is configured to multiplex an output of the first accumulator and an output of the first adder according to a control signal.

14. A data transmitting method comprising:
delaying data to be transmitted by at least two delay times, wherein each of the at least two delay times occurs sequentially;
multiplexing the data, which has been delayed, according to a control signal; and
transmitting the data and a reference signal, which corresponds to the data and has a same transmission length as the data, at an interval of delay time,
wherein the delaying the data to be transmitted by the at least two delay times comprises:
delaying the transmitted data by a first delay time; and
delaying the data delayed for the first delay time by a second delay time which is different from the first delay time, and
wherein the reference signal is transmitted without delay, together with the multiplexed data.

15. The method as recited in claim 14, wherein the second delay time is shorter than the first delay time.

16. The method as recited in claim 15, wherein the data are transmitted by mapping chaotic signals.

17. A data receiving method comprising:
delaying a received reference signal by at least two delay times to generate delayed versions of the received reference signal, wherein each of the at least two delay times occurs sequentially;
multiplexing the delayed versions of the received reference signal, according to a control signal, to generate multiplexed data; and
multiplying the multiplexed data by received signal data corresponding to the multiplexed data,
wherein the delaying the received reference signal by the at least two delay times comprises:
delaying the received reference signal by a first delay time; and
delaying the received reference signal delayed for the first delay time by a second delay time which is different from the first delay time, and
wherein the multiplexed data and the received data corresponding to the multiplexed data have a same transmission length.

18. The method as recited in claim 17, wherein the second delay time is shorter than the first delay time.

* * * * *